United States Patent [19]
Christine et al.

[11] 3,758,005
[45] Sept. 11, 1973

[54] DISPENSING SYSTEM

[75] Inventors: William C. Christine, Catasaqua; William E. R. Watt, Barto, both of Pa.

[73] Assignee: Inpaco, Allentown, Pa.

[22] Filed: Dec. 7, 1971

[21] Appl. No.: 205,692

[52] U.S. Cl. .............................. 222/309, 222/380
[51] Int. Cl. ............................................ G01f 11/06
[58] Field of Search .................. 222/191, 192, 309, 222/380, 383, 385, 372, 386, 335; 239/526

[56] References Cited
UNITED STATES PATENTS

| | | | |
|---|---|---|---|
| 3,353,537 | 11/1967 | Knox et al. | 222/334 X |
| 1,643,969 | 10/1927 | Tittemore et al. | 239/526 |
| 3,291,350 | 12/1966 | Malec | 222/383 X |
| 3,207,384 | 9/1965 | Wall | 222/309 X |
| 3,231,149 | 1/1966 | Yuza | 222/309 X |
| 3,517,668 | 6/1970 | Brickson | 222/309 X |

*Primary Examiner*—Robert B. Reeves
*Assistant Examiner*—Joseph J. Rolla
*Attorney*—Sherman Levy

[57] ABSTRACT

A dispensing system which is adapted to discharge controlled quantities of a substance such as a condiment. The dispenser includes a forward chamber housing a trigger controlled piston and inlet and outlet means to the chamber being regulated by spring pressed check valves. An arcuate cradle and fitment are provided for mounting a flexible disposable puch on the dispenser.

1 Claim, 5 Drawing Figures

Patented Sept. 11, 1973

Patented Sept. 11, 1973 3,758,005
2 Sheets-Sheet 2
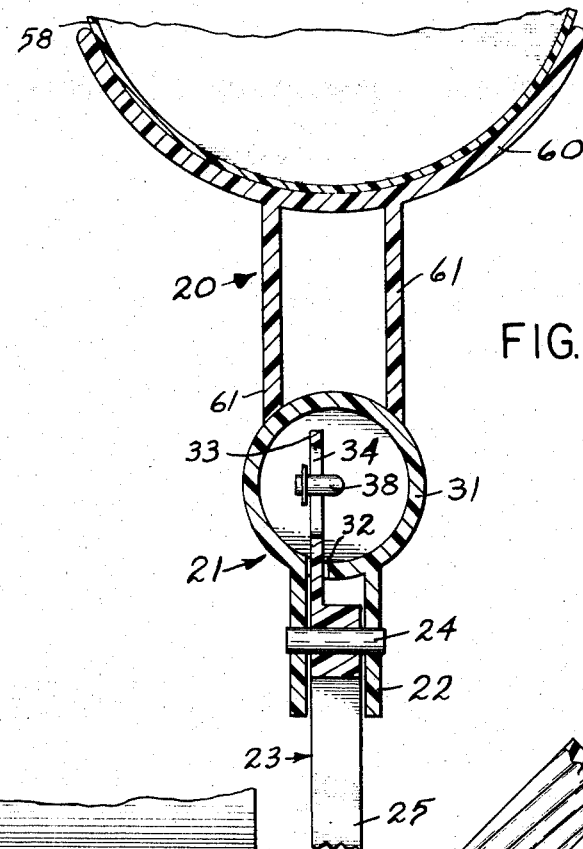
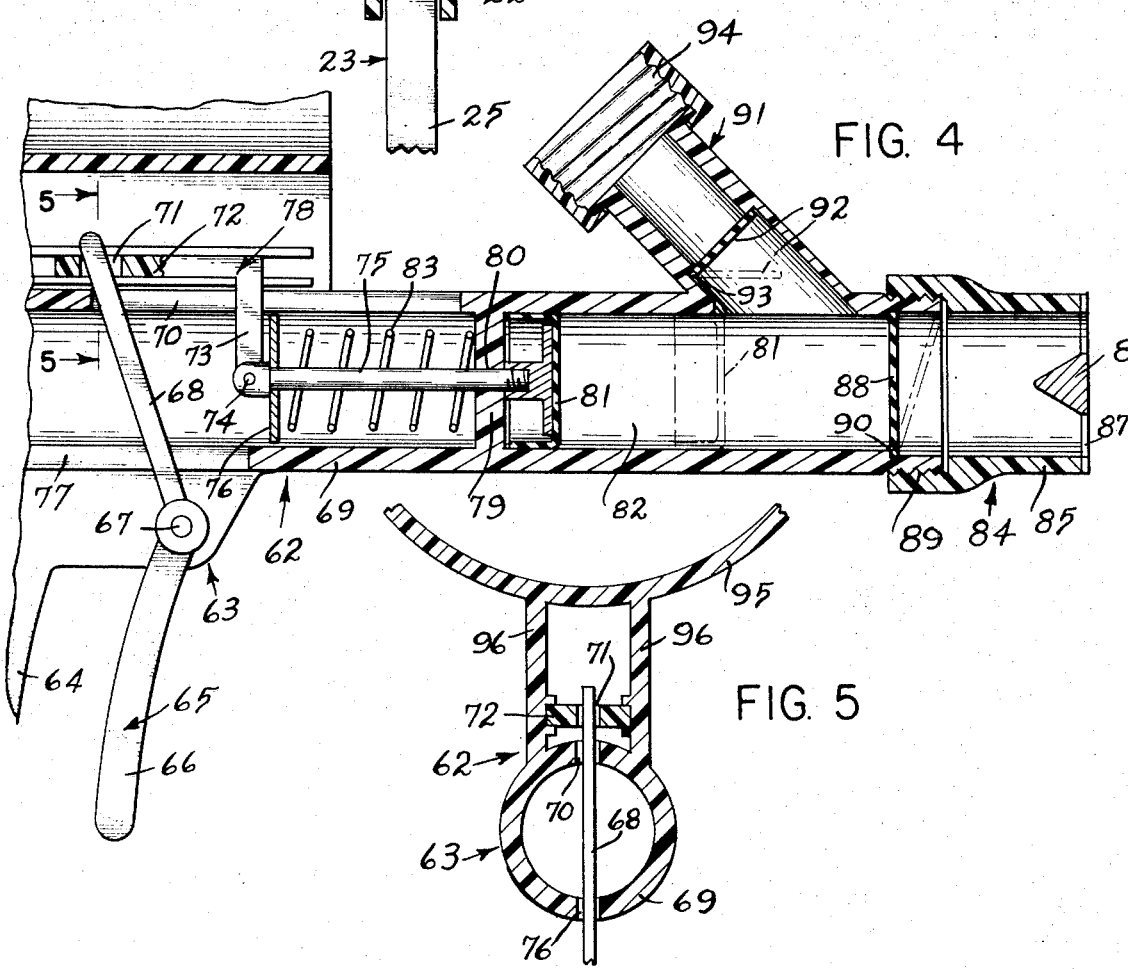

DISPENSING SYSTEM

The present invention relates to a dispensing system, and more particularly to a dispensing system whereby controlled portions or quantities of material can be accurately and conveniently dispensed from a pouch or container that is conveniently mounted on the device.

An object of the present invention is to provide a dispenser that can be manually actuated, whereby a controlled quantity or portion of material can be dispensed from a flexible pouch or container so that the material can be conveniently and readily dispensed onto a desired surface, member, article, or other area.

Another object of the present invention is to provide a dispensing system for use with condiments or other materials whereby there is provided a means for quickly and easily dispending controlled portions of such condiments such as mayonaise, ketchup, mustard, tartar sauce, or the like, and whereby other products can also be dispensed that are not in the food field, such as sanitizing agents, pharmaceuticals, and the like.

Another object is to provide a device of the character described that is economical to manufacture, efficient in operation, which is rugged in structure and foolproof in use.

These and other objects of the invention will become apparent from a reading of the following specification and claims, together with the accompanying drawing, wherein like parts are referred to and indicated by like reference characters, and wherein:

FIG. 3 is an enlarged sectional view, taken on the line 3—3 of FIG. 2.

FIG. 4 is an enlarged fragmentary vertical sectional view, illustrating a modification.

FIG. 5 is an enlarged sectional view taken on the line 5—5 of FIG. 4.

Figure 1:
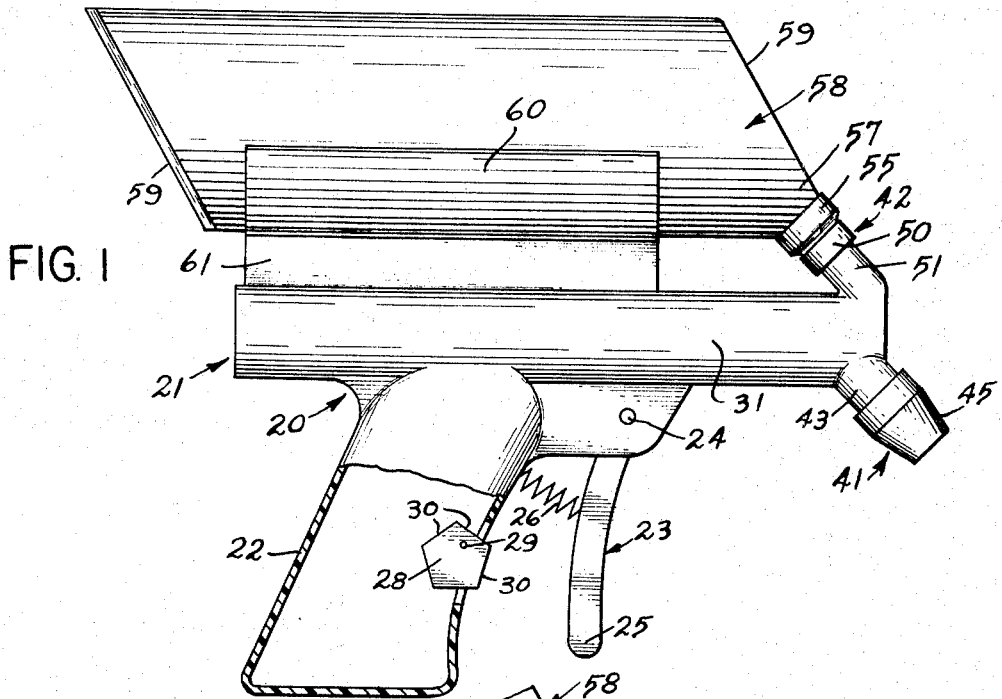
FIG. 1 is a side elevational view illustrating one application of the present invention, and with parts broken away and in section.
Figure 2:
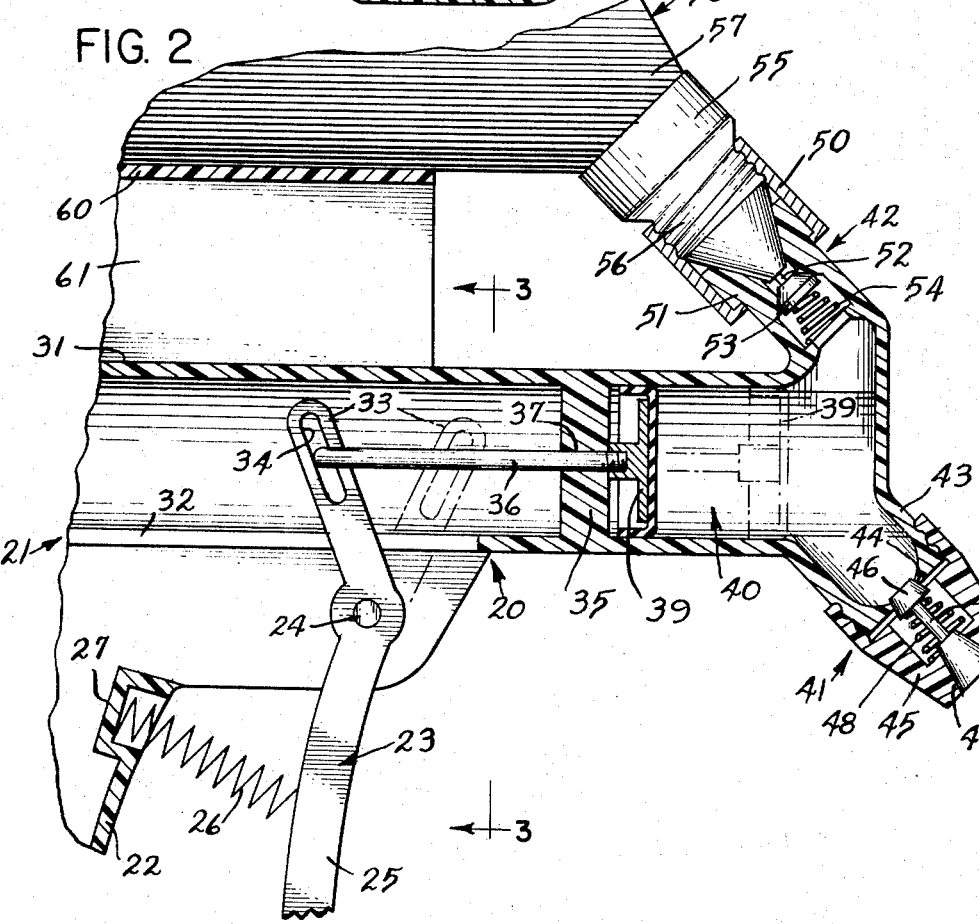
FIG. 2 is an enlarged fragmentary vertical sectional view illustrating certain constructional details of the present invention.

Referring in detail to the drawings, and more particularly to FIGS. 1, 2 and 3 of the drawings, the numeral 20 indicates a dispenser that includes a body member 21 which has an integral handle portion 22, and the numeral 23 indicates a lever or trigger that is pivotally connected to the body member 21 as at 24, FIGS. 1 and 2.

The trigger 23 includes a lower portion 25 that is adapted to be squeezed or engaged, and the numeral 26 indicates a spring member that is interposed between the portion 25 and a recessed seat 27 in the handle 22. A stop member 28 is pivotally or adjustably connected as at 29 to the handle 22 and the stop member 28 includes a plurality of flat surfaces or faces 30 that can be positioned to be selectively engaged by the portion 25 so as to limit the travel or movement of the trigger 33, whereby controlled portions of material can be dispensed, as will be later described in this application.

The body member 21 includes a cylindrical barrel portion or hollow base portion 31 that has a slot 32 in the lower section thereof, FIG. 3, and the upper portion or extension 33 of the trigger 23 is movably mounted in the slot 32. The upper portion 33 has a slotted section 34 therein, and the numeral 36 indicates a rod or stem that has an end portion 38 engaging the slot 34. A wall section 35 is arranged in the base or barrel 31, and the wall section 35 has an aperture or opening 37 therein for the movable projection therethrough of stem 36. The front end of the stem 36 is connected to a movable piston or plunger 39 that is movably arranged in a chamber 40, and the chamber 40 is disposed or arranged forwardly of the wall section 35.

An outlet unit 41 as well as a material inlet unit 42 is provided, as shown in the drawings. The outlet 41 includes a tip or nozzle 43 that may be externally threaded, and a port or aperture 44 is provided in the section 43. The numeral 45 indicates a fitting that is detachably or threadedly connected to the threaded portion of the section 43, and a check valve 46 is mounted for movement into and out of opening and closing relation with respect to the port 44. The numeral 47 indicates a stem or rod that is connected to the valve 46 and a coil spring or spring member 48 is circumposed on the rod 47 for normally urging the valve 46 into closed relation with respect to the port 44. The member 45 has a discharge outlet opening 49 so that the condiment or other material can be selectively dispensed therefrom onto an article that is to receive the material.

The numeral 50 indicates a coupling or connector that engages an inlet portion 51 of the dispenser, and the portion 51 has a port or opening 52 therein, there being a check valve 53 mounted for movement into and out of opened and closed relation with respect to port 52. A spring member 54 is provided for normally urging or biasing the valve 53 into closed relation with respect to the port 52. The numeral 55 indicates a fitting that may have a threaded portion 56 that is engaged by the port 50, and the fitting 55 is adapted to selectively engage a corner portion 57 of a pouch or container 58 that has the material to be dispensed. The pouch 58 is adapted to have end portions 59 that are arranged at an angle with respect to the longitudinal axis of the pouch, FIG. 1. The pouch 58 is made of a suitable flexible material, and the pouch 58 is conveniently supported or received in an arcuate member or portion 60 that is supported by upstanding wall sections or portions 61, FIG. 3.

Referring now to FIGS. 4 and 5 of the drawings, there is illustrated a modified dispenser that is indicated generally by the numeral 62, and the dispenser 62 includes a body member 63 that has a handle portion 64 as well as a trigger or manually operable lever 65. The trigger 65 includes a lower portion 66 that is adapted to be gripped, and the trigger 65 is pivotally connected as at 67 to the body member. The trigger 65 further includes an upper portion 68 that extends through a slot 77 in the barrel or base portion 69, and the extension or portion 68 also projects through a slot 70 in the device and into engagement with an opening or slot portion 71 in the section 72 of an L-shaped member 78. The member 78 also includes a depending portion 73 that is connected as at 74 to the rear end of a rod or stem 75. The rod 75 projects through a retainer 76, as shown in FIG. 4. The rod 75 extends through a central opening 80 in the wall section 79 and the front end of the rod 75 is connected to a movable piston or plunger 81 that is movably mounted in a chamber 82 that is disposed in the front portion of the member 69. The numeral 83 indicates a coil spring that is circumposed on the rod 75, and the coil spring 83 is interposed between the member 76 and the wall section 79, as shown in the drawings.

The numeral 84 indicates a discharge outlet means that consists of a nozzle or fitting 85 that is threadedly connected as at 89 to an end of the unit 69, and a guide portion 86 is provided in the member 85 whereby the paste-like material or other material can be dispensed out through the area 87 onto the desired surface. The numeral 88 indicates a flexible check valve that may have its lower end 90 anchored in place, while the upper or opposite portion is free to flex so as to selectively permit the material to be dispensed or discharged from the device. There is further provided for the device 62 an inlet means that is indicated by the numeral 91 and the inlet means 91 includes a one-way or check valve 92 that may have an end portion 93 anchored in place, and the valve 92 can pivot or move from the solid line position of FIG. 4 to the broken line position of FIG. 4, or vice versa. The numeral 94 indicates an internally threaded connector or fitting for the unit 91, and the fitting 94 is adapted to receive a member such as the member 55 that has a pouch, such as the pouch 58 connected thereto.

In FIGS. 4 and 5, the numeral 95 indicates an arcuate section or cradle portion that functions generally in the same manner as the previously described arcuate portion 60, that is the portion 95 is adapted to provide a support for the flexible pouch or container such as the pouch 58. The arcuate portion 95 may be supported by wall sections or portions 96.

From the foregoing, it will be seen that there has been provided a dispensing system, and in use, with the parts arranged as shown in the drawings, and in particular as shown in FIGS. 1 2 and 3, the pouch or container can be made of a suitable material such as plastic and is adapted to be positioned on the arcuate portion 60, and the pouch 58 can be initially filled with a suitable quantity of material to be dispensed, such as a condiment, or the like. The member 55 can be arranged in engagement with an end portion 57 of the pouch 58 in such a manner as to form an opening in the corner of the pouch 58, and the coupling 50 will connect the member 55 to the inlet portion 51. The outlet nozzle or pip 41 can be arranged as shown. Then, by manually squeezing or depressing the portion 25 of the lever 23 against the pressure of the spring 26, it will be seen that the portion 33 will move from left to right or from the solid line position of FIG. 2 to the broken line position of FIG. 2, and this will cause the rod 36 to move forwardly to thereby move the plunger 39 from a position such as the position shown in solid lines in FIG. 2 to the dotted line position of FIG. 2.

As the plunger 39 moves in the chamber or compartment 40, it will cause the material to be selectively dispensed out through the outlet 41. When the manual pressure is released on the portion 25, the spring 26 will return the parts to the solid line position of FIG. 2, so that the plunger 39 will move back to the solid line position shown in the drawings, and this will create a vacuum whereby additional material will be sucked or withdrawn from the container down through the port 52, and passed the open valve 53 and into the chamber 40. Then, as the cycle is repeated, the plunger 39 will create pressure to close the valve 53 on the port 52, and at the same time this pressure from the plunger 39 will open the valve 46 on the port 44 so that the material will be dispensed out through the port 44, and then out through the opening 49 onto the desired article or surface.

The stop member 28 can be adjusted to permit different quantities of material to be dispensed. Thus, by shifting or rotating the stop member 28 on its pivot pin 29, different surfaces 30 can be positioned to be engaged by the portion 25 of the lever 23, so as to limit the amount of travel of the trigger 23, and thus, this provides a means for regulating or controlling the amount of material that is dispensed from the device. When the container or pouch 58 is empty, the parts can be disassembled and a new part 58 can be arranged thereon so that additional quantities of material can be dispensed in the same manner.

The purpose of the device 62 shown in FIGS. 4 and 5 is generally the same as that shown in FIGS. 1, 2 and 3. Thus, in FIGS. 4 and 5, a pouch such as the pouch 58 can be arranged in engagement with the portion 95, and the member 94 can be connected to a corner portion 57 of a pouch 58. Then, by manually acuating the trigger or lever 65, the trigger will pivot about its pivot pin 67, so as to cause the links 78 to move from left to right, FIG. 4, and this will cause the spring 83 to be compressed to move the piston 81 forwardly in the chamber 82. Then, when manual pressure on the portion 66 of the trigger 65 is released, the spring 83 will return the parts to the solid line position shown in FIG. 4, and this will create a vacuum to cause some of the material from the parts 58 to be sucked passed the check valve 92, so that the check valve 92 can move from the solid line position of FIG. 4 to the broken line position of FIG. 4, and this material can then be received in the chamber 82. Then, when the cycle is repealed, that is when manual pressure is applied to the portion 66, the plunger 81 will move from left to right to close the check valve 92 and at the same time open the check valve 88, so that the material in the compartment 82 will be forced out through an opening such as the opening 87 onto the desired surface or article.

The parts can be made of any suitable material and in different shapes or sizes as desired or required.

A primary purpose of the present invention is to provide a means for quickly and easily dispensing controlled portions of various materials, such as condiments, manyonnaise, ketchup, mustard, tartar sauce, or other materials in the food products field, as well as a variety of other products not in the food field, such as sanitizing agents, pharmaceuticals, and the like.

At the present time, there are a number of methods for dispensing condiments and the like into sandwiches, or onto food products on a platter. For example, in a central kitchen, condiments can be spooned from a large reservoir onto the food product or into a container for the condiment, or, in a fast food service operation, portion packed products can be used, or a variety of other methods, such as mechanically dispensing means using an elaborate pumping station with interconnecting hoses, valves, and other rather complex mechanical and electrical devices, can be used.

The present invention serves to eliminate such complicated equipment for dispensing condiments, and at the same time maintains control of the size of the portions with a very easily sanitized dispensing technique and also avoids the high cost of individual portion packaging.

The present invention combines three elements or features, first a system wherein the condiment is prepackaged in a flexible pouch and sealed in such fashion that no air is present in the pouch. The seals on the tubular plastic material from which the pouch 58 is made, are formed in a manner so that they are at approximately a 45° angle with respect to the longitudinal axis of the tube, and these seals are indicated by the numeral 59. This is done to permit the formation of a corner cap where a special discharge orifice system is connected, and this special discharge orifice system becomes part of the pouch, and may be cemented or heat sealed or otherwise mechanically secured to the one corner such as the corner 57 of the pouch 58.

In addition, turned threads or a twist lock fastener is adapted to be provided on the body of the piece which is attached to the pouch 58 at the orifice shield, and there is also provided a cap which fastens onto the orifice shield, to protect the end corner of the pouch prior to the time that the pouch is to be used. This also provides a recloseable feature, should it be desired to only use one-half of the pouch and reclose it, so that it can be stored for subsequent use. When the cap is removed, it's self contained blades shear off the corner of the pouch, making it ready to dispense.

An additional feature or aspect of the condiment dispensing system is the handle that provides a support for the pouch and the frame on which the dispensing or metering unit is mounted. It is to be understood that the present invention includes various kinds of power units that can be used to drive the metering head of the system, and for example remotely connected pneumatic or hydraulic or mechanically driven can be used if desired instead of manual power for stroking or operating the metering head.

If the handle incorporates or includes the power unit, the device can include a trigger-like device for actuating the metering head or a side-mounted handle for actuating the metering head, or it can include or incorporate a spring loading system and a trigger and sear arrangement, such as is used in a firearm, or the like.

An additional feature of the condiment dispensing system consists of the metering head, and the metering head is composed of essentially two valves and a piston, such as the piston 39 or the piston 81 and a replaceable nozzle. The piston provides the air from the chamber of the head to cause atmospheric pressure to force the product from the pouch into the metering chamber. On the return stroke, the one-way valves function so that the product can only flow through the discharge valve and nozzle. The nozzle may be of a desired configuration that is predetermined for the viscosity of the product, and depending on whether or not the product is to be dispensed includes solids suspended in various liquids or the like.

A series of mechanical stops such as the surfaces 30 on the stop member 28 can be easily adjusted on the operating end of the device, so that the amount of product being discharged can be accurately regulated by controlling the length of the stroke of the piston.

Because the device includes the three elements, it will be seen that the sanitation of the metering head can be quickly and easily accomplished by a simple dismounting from the handle or handle power unit combination, and then completely immersed in sanitizing and sterilizing solutions. The pouch 58, if not empty can be reclosed with a convenient cap and stored under refrigeration for further subsequent use.

It will, therefore, be seen that in accordance with the present invention there has been provided a unique vertical form "fill and seal pouch" with a metering dispensing system, and there is also provided a unique method of attaching a seal pouch to a metering dispensing system. There is also provided a unique method for metering and dispensing condiments and other liquids, semi-liquids, and the like, from a sealed container. Further, there is a sanitary method for discharging the contents of a pouch of viscous material without contamination by external contact. Also, there is a unique method of opening a pouch of viscous material and also a unique method of dispensing a variety of viscous material.

It is to be understood that the opening position of the pouch 58 is not limited to the corner location. Thus, in some instances, there are advantages from a dispenser standpoint and also for manufacturing the pouch, in locating it in other than the corner location.

In addition, a knife type device may be incorporated in the inlet portion 51 of the dispenser so that when engaging the pouch to the dispenser, the pouch is opened. Further, the angle of the pouch may vary from 45° to 90°, and preferably will be in the area of 60°.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

We claim:

1. In a unitary dispenser for dispensing controlled metered quantities of material such as condiments, a body member including a handle, a pivotally mounted stop member adjustably connected to said handle, a manually operable trigger pivotally connected to said handle and including a lower portion for selectively engaging said stop member, a coil spring engaging said trigger, said body member including a hollow cylindrical base portion having a wall section therein, a chamber arranged forwardly of said wall section, a plunger movably mounted in said chamber, a rod projecting through said wall section, and having its front end connected to said plunger and its rear end connected to said trigger, a dispensing nozzle connected to the lower portion of said chamber, a spring pressed check valve mounted in said dispensing nozzle, an inlet nozzle member communicating with said chamber and said inlet nozzle member having a spring pressed check valve therein, an arcuate cradle section on said member, a disposable flexible pouch containing material to be dispensed mounted in said cradle section, a fitting connecting a corner of the pouch to the inlet nozzle means.

* * * * *